UNITED STATES PATENT OFFICE.

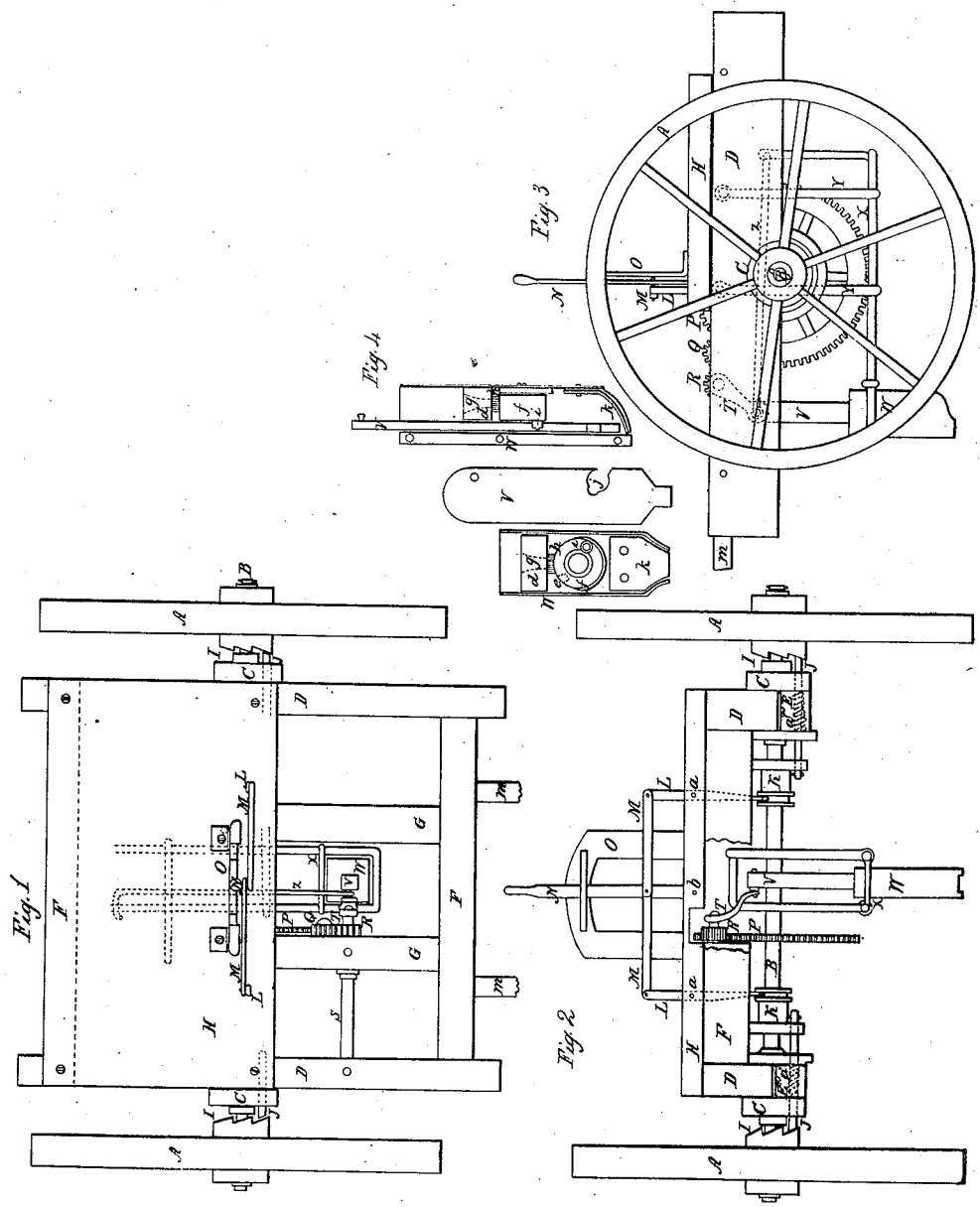

THOMAS B. HOUGHTON, OF BLOOMINGTON, ILLINOIS.

IMPROVEMENT IN SEED-PLANTERS.

Specification forming part of Letters Patent No. 16,585, dated February 10, 1857.

*To all whom it may concern:*

Be it known that I, THOMAS B. HOUGHTON, of Bloomington, in the county of McLean and State of Illinois, have invented certain new and useful Improvements in Seed-Planters; and I do hereby declare that the same are described and represented in the following specification and drawings.

To enable others skilled in the art to make and use my improvements, I will proceed to describe their construction and use, referring to the drawings, in which the same letters indicate like parts in each of the figures.

Figure 1 is a plan or top view of the machine. Fig. 2 is a front elevation, and Fig. 3 a side elevation; Fig. 4, the planting-tube.

The nature of my invention and improvements in seed-planters consists in operating the traversing slide and tube, which delivers and deposits the seed by means of a crank, which receives its motion from one or both of the carriage-wheels; also, in arranging some levers, pawls, and ratchets so as to enable the operator to lock that wheel to the axle that is returning in its own track, so as to measure the distances between the deposits of seed more accurately; and, further, in a reciprocating frame operated so as to guide the planting-tube and slide that traverses through it, so as to make the deposits of seed at the desired point in the ground.

In the accompanying drawings, A A are the carriage-wheels, made to turn on the axle B, which has two collars, C C, fastened to it, which turn in scores in the rails D D, being retained in the scores by the straps E E, which are screwed to the rails. The rails D D are connected together by the bars F F, which are also connected by the rails G G, parallel to the rails D D, the whole forming the carriage-frame of the machine, the rear half being covered by the floor H. The inner ends of the hubs of the wheels A A are provided with ratchets I I, which are caught by the pawls J J in the collars C C, so as to lock the wheels to the axle B and turn it when desired. The pawls J J are connected to the collars K K, which traverse on the axle B, being operated by the levers L L, which fork into the scores in the collars K K for that purpose. The levers L L vibrate on pins *a a* in the floor H, and are connected by the links M M to the lever N, which vibrates on the pin *b* in the floor H, and is supported and retained by the frame O, fastened to the floor, so that the operator can traverse the collars K K and pawls J J to lock either wheel to the axle B or allow both wheels to turn on the axle by vibrating the lever N. The pawls J J are pressed into the ratchets by spiral springs *a'*, (shown by dotted lines in Fig. 2,) so that the pawls will slip back and let the teeth of the ratchet pass if the wheel is turned backward. The gear P is fastened to the axle B, and turned by it to operate the pinions Q and R, the former turning on a stud in the rail G and the latter carrying the shaft S, which turns in the rails D and G, as shown in the drawings, and carries the crank T, which operates the planting-slide V, to which it is connected. The planting-slide V traverses in the seed-box W, (shown enlarged at Fig. 4,) which it carries and operates through the traversing guide-frame X, which traverses in the stands or hangers Y Y, fastened to the rails G G for that purpose. The guide-frame X is connected to the crank T by the link Z, which traverses it so as to guide the seed-box and planting-slide and make them deposit the seed at the point designed for them.

The seed box or delivery apparatus is made in the form shown in Fig. 4, in which W is the box or case, to which the slide V is fitted so as to traverse freely in it by the side of the partition *d*, which supports the seed which is put in the box above it. This partition is perforated, as shown by dotted lines, so as to let the seed down into the cavity *e* (also shown by dotted lines) in the roller *f*, the hole *g* in the partition being surrounded with bristles *h*, so as to retain all the seed except those in the cavity *e*, which are carried round as the roller *f* is turned by the pin *i*, acted upon by the cam-shaped score *j* in the slide V, and slide down between the side of the box and the spring *k*, and are forced out by the end of the slide V and deposited in the ground. As the slide V is drawn up by the crank T it turns the roller *f* so that the cavity *e* receives a new supply of seed for the next deposit or hill.

A pair of shafts may be applied to the machine, which are shown as broken off at *m m*, Fig. 1, to which an animal may be harnessed in some convenient manner to draw the machine.

The machine having been constructed as above described and some seed put into the box W, the machine may be drawn to the field without locking either wheel to the axle; but when the machine arrives upon the ground to be planted one of the wheels may be locked to the axle by moving the lever N, so as to set the gearing and planting-tube in motion, which will be operated by the crank attached to the slide so as to deposit the seed from the box, as heretofore described. When the opposite side of the field is reached the lever N may be moved to unlock the wheel, while the machine is turning. After it is turned and one of the wheels is brought into the track in which it came, the lever N may be moved so as to lock that wheel to the axle and operate the machine by the wheel that is returning in its own track, which it made when going in the opposite direction. By unlocking the wheel when turning at the end the seeding machinery stops, so that there is no seed delivered or deposited while the machine is turning. By letting the wheel which operates the seeding machinery return in its own track the unevenness of the ground is so far overcome that with a little care and attention the seed may be deposited so near opposite to the previous deposits that the crop may be cultivated both ways, or in two directions at right angles to each other.

I contemplate that machines with my improvements may be made with two, three, or such a number of planting-tubes as may be desired for the kind of planting intended.

I believe I have described and represented my improvements in seed-planters so as to enable any person skilled in the art to make and use them.

I will now state what I desire to secure by Letters Patent, viz:

1. Operating the planting slide and tube by means of a crank receiving its motion from one or both of the carriage-wheels, substantially in the manner described.

2. The reciprocating frame X, or its equivalent, so constructed and operated as to guide the planting-tube and make it deposit the seed in the ground at the desired point, substantially as described.

THOS. B. HOUGHTON.

Witnesses:
H. M. REED,
A. STEELE.